(12) United States Patent
Pettey

(10) Patent No.: US 7,934,691 B2
(45) Date of Patent: May 3, 2011

(54) PAN SYSTEMS

(75) Inventor: Brian Pettey, Winfield, KS (US)

(73) Assignee: Robotzone LLC, Winfield, KS (US)

( * ) Notice: Subject to any disclaimer, the term of this patent is extended or adjusted under 35 U.S.C. 154(b) by 131 days.

(21) Appl. No.: 12/412,699

(22) Filed: Mar. 27, 2009

(65) Prior Publication Data

US 2009/0179127 A1 Jul. 16, 2009

Related U.S. Application Data

(63) Continuation-in-part of application No. 11/153,800, filed on Jun. 15, 2005, now Pat. No. 7,559,129, application No. 12/412,699, which is a continuation-in-part of application No. 12/368,536, filed on Feb. 10, 2009, now Pat. No. 7,750,517.

(60) Provisional application No. 60/584,288, filed on Jun. 30, 2004.

(51) Int. Cl.
*F16M 11/00* (2006.01)

(52) U.S. Cl. .......... 248/676; 248/674; 248/300; 310/91; 310/99

(58) Field of Classification Search .................. 248/676, 248/674, 300, 314; 310/91, 75 R, 99
See application file for complete search history.

(56) References Cited

U.S. PATENT DOCUMENTS

| | | | | |
|---|---|---|---|---|
| 3,139,549 A * | 6/1964 | Groth | | 310/97 |
| 3,423,656 A | 1/1969 | Tripp | | 318/570 |
| 3,536,280 A * | 10/1970 | Barlow | | 248/676 |
| 3,586,272 A * | 6/1971 | Pestell | | 248/631 |
| 4,180,205 A | 12/1979 | Schwartz | | 235/411 |
| 4,979,855 A | 12/1990 | Babel | | 409/218 |
| 5,228,288 A | 7/1993 | Sollami | | 60/368 |
| 5,290,005 A * | 3/1994 | Akiyama et al. | | 248/671 |
| 5,762,439 A | 6/1998 | Siner | | 406/359.6 |
| 6,378,834 B1 * | 4/2002 | Baker | | 248/674 |
| 6,579,031 B2 | 6/2003 | Bien | | 406/359.1 |
| 7,021,599 B2 * | 4/2006 | DeGrazia et al. | | 248/645 |
| 7,053,510 B2 * | 5/2006 | Doi | | 310/89 |
| 7,285,884 B2 | 10/2007 | Pettey | | 310/75 R |
| 7,336,009 B2 * | 2/2008 | Pettey | | 310/75 R |
| 7,642,741 B2 * | 1/2010 | Sidman | | 318/649 |

(Continued)

OTHER PUBLICATIONS

Anderson, D.; "Improving Servo Positioning Accuracy," http://www.seattlerobotics.org/encoder/200010/servohac.html pp. 1-9, Sep. 19, 2000.

(Continued)

*Primary Examiner* — Terrell McKinnon
*Assistant Examiner* — Bradley H Duckworth
(74) *Attorney, Agent, or Firm* — Westman, Champlin & Kelly, P.A.

(57) ABSTRACT

Pan systems are provided. Pan systems illustratively include a hobby servo motor having a splined output shaft, a rotatable auxiliary shaft that is approximately parallel to the splined output shaft, and a one piece support frame. In an embodiment, the one piece support frame has a top panel, a center panel, a first side, and a second side. The top panel and the center panel are approximately parallel. The first side and the second side are approximately parallel. The top panel and the center panel are approximately perpendicular to the first side and the second side. The top and center panels illustratively each include a hobby servo motor aperture and an auxiliary shaft aperture. The hobby servo motor is positioned within the hobby servo apertures and the rotatable auxiliary shaft is positioned within the auxiliary shaft apertures.

20 Claims, 15 Drawing Sheets

U.S. PATENT DOCUMENTS

2003/0209645 A1* 11/2003 DeGrazia et al. ............. 248/674
2005/0258695 A1* 11/2005 Suimon et al. ........... 310/156.32

OTHER PUBLICATIONS

Anderson, D.; "Improving Servo Positioning Accuracy," http://web.archive.org/web/*/http://www.geology.smu.edu/~dpa-www. pp. 1-8, Sep. 19, 2000.

Wheat, D.; "Hacking the Tower Hobbies TS-53 Servo," DPRG: http://web.archive.org/web/20040623092815/dprg.org/projects/2003-05a/, May 9, 2003, pp. 1-7.

Brown, J.; "Sub Micro Servo Motor Hack," DPRG http://web.archive.org/web/20040622205626/dprg.org/projects/1998-04b/ Apr. 1998, pp. 1-11.

Anderson, D. "Improving Servo Positioning Accuracy," DPRG, http://www.dprg.org/projects/2000-09a/?, Sep. 19, 2000. pp. 1-5.

* cited by examiner

PAN SYSTEMS

The present application is a continuation-in-part of, and is based on, and claims the benefit of U.S. utility patent application Ser. No. 11/153,800, filed on Jun. 15, 2005, and U.S. utility patent application Ser. No. 12/368,536, filed on Feb. 10, 2009, the contents of which are hereby incorporated by reference in their entireties, the former application being based on U.S. provisional application 60/584,288, filed on Jun. 30, 2004.

BACKGROUND

The present invention generally pertains to pan systems. More specifically, the present invention pertains to pan systems that utilize hobby servo motors.

Pan systems are used in a great variety of applications such as applications that require controlled pan motion. One illustrative application is to use a pan system with a camera. Cameras commonly include a limited field of view. In many situations, it is desirable to change the positioning of a camera to capture multiple fields of view. For example, in a store setting, it may be desirable to have a camera that can view both an entry way and a cash register area. Pan systems are used to control the positioning of a camera, and thus enable the camera to capture multiple fields of view.

A hobby servo motor (a.k.a. simply a "servo") is a device having a rotatable output shaft. The output shaft can typically be positioned to specific angular positions in accordance with a coded input signal received by the servo. It is common that a particular angular position of the output shaft will be maintained as long as a corresponding coded signal exists on an input line. If the coded signal changes, the angular position of the shaft will change accordingly. Control circuits and an internal potentiometer are typically included within the servo motor casing or housing, and are functionally connected to the output shaft. Through the potentiometer (e.g., a variable resistor), the control circuitry is able to monitor the angle of the output shaft. If the shaft is at the correct angle, the motor actuates no further changes. If the shaft is not at the correct angle, the motor is actuated in an appropriate direction until the angle is correct.

There are different types of servo motors that include output shafts having varying rotational and torque capabilities. For example, the rotational and/or torque capability of an industrial servo is typically less restricted than that of a hobby servo. That being said, hobby servos are generally commercially available at a cost that is much less than that associated with industrial servos.

Because hobby servos are relatively small and inexpensive, they are popular within the hobby-mechanical industry for applications such as, but by no means limited to, hobby robotic applications and radio-controlled models (e.g. cars, planes, and boats). One example of a hobby servo is the Futaba S-148 available from Futaba Corporation of America located in Schaumburg, Ill.

The output shaft of a hobby servo is typically capable of traveling approximately 180° (possibly up to 210° or more depending on manufacturer). Rotation of the hobby servo shaft is limited typically by one or more internal mechanical stops. It is also typically true that the output shaft of a hobby servo is capable of producing a relatively limited amount of torque power. The torque and rotational limitations of a hobby servo are adequate for many hobby applications, such as model car steering control, puppet control, robot arm or head movement and/or model airplane rudder control.

Some hobby servos can be mechanically altered to provide an extended range of rotation. However, this solution requires mechanical alteration that often only works for some types of servos. Rotational control for most hobby servos is limited by the internal potentiometer being utilized to monitor rotation. When a hobby servo is hacked or modified to extend the rotational capacity, the internal potentiometer of the servo will, in most instances, not be configured to monitor angular positions too far beyond the original range of rotation. Thus, the control system of a hacked servo will commonly not be configured to accurately position the servo output shaft too far within the extended range of rotation.

SUMMARY

Pan systems are provided. Pan systems illustratively include a hobby servo motor having a splined output shaft, a rotatable auxiliary shaft that is approximately parallel to the splined output shaft, and a one piece support frame. In an embodiment, the one piece support frame has a top panel, a center panel, a first side, and a second side. The top panel and the center panel are approximately parallel. The first side and the second side are approximately parallel. The top panel and the center panel are approximately perpendicular to the first side and the second side. The top and center panels illustratively each include a hobby servo motor aperture and an auxiliary shaft aperture. The hobby servo motor is positioned within the hobby servo apertures and the rotatable auxiliary shaft is positioned within the auxiliary shaft apertures.

BRIEF DESCRIPTION OF THE DRAWINGS

FIG. 4-1 is a perspective view of a hobby servo motor.

FIG. 4-2 is a side view of a hobby servo motor.

FIG. 4-3 is a perspective view of a hobby servo motor showing an internal potentiometer and control circuit removed from the hobby servo housing.

FIG. 5-1 is an exploded view of a tilt system.

FIG. 5-2 is a perspective view of an assembled tilt system.

FIG. 9-1 is a side view of a pan system from the pan servo side.

FIG. 9-2 is a side view of a pan system from the external potentiometer side.

FIG. 10-1 is a perspective view of a pan housing frame from the bottom side.

FIG. 10-2 is a perspective view of a pan housing frame from the top side.

FIG. 10-3 is a side view of a pan housing frame.

FIG. 11-1 is a perspective view an alternative pan system.

FIG. 11-2 is an exploded view of an alternative pan system.

FIG. 11-3 is a side view of an alternative pan system from the pan servo side.

FIG. 11-4 is a side view of an alternative pan system from the potentiometer side.

FIG. 11-5 is a side view of an alternative pan system.

DETAILED DESCRIPTION

I. Overview of Pan and Tilt System

Figure 1:
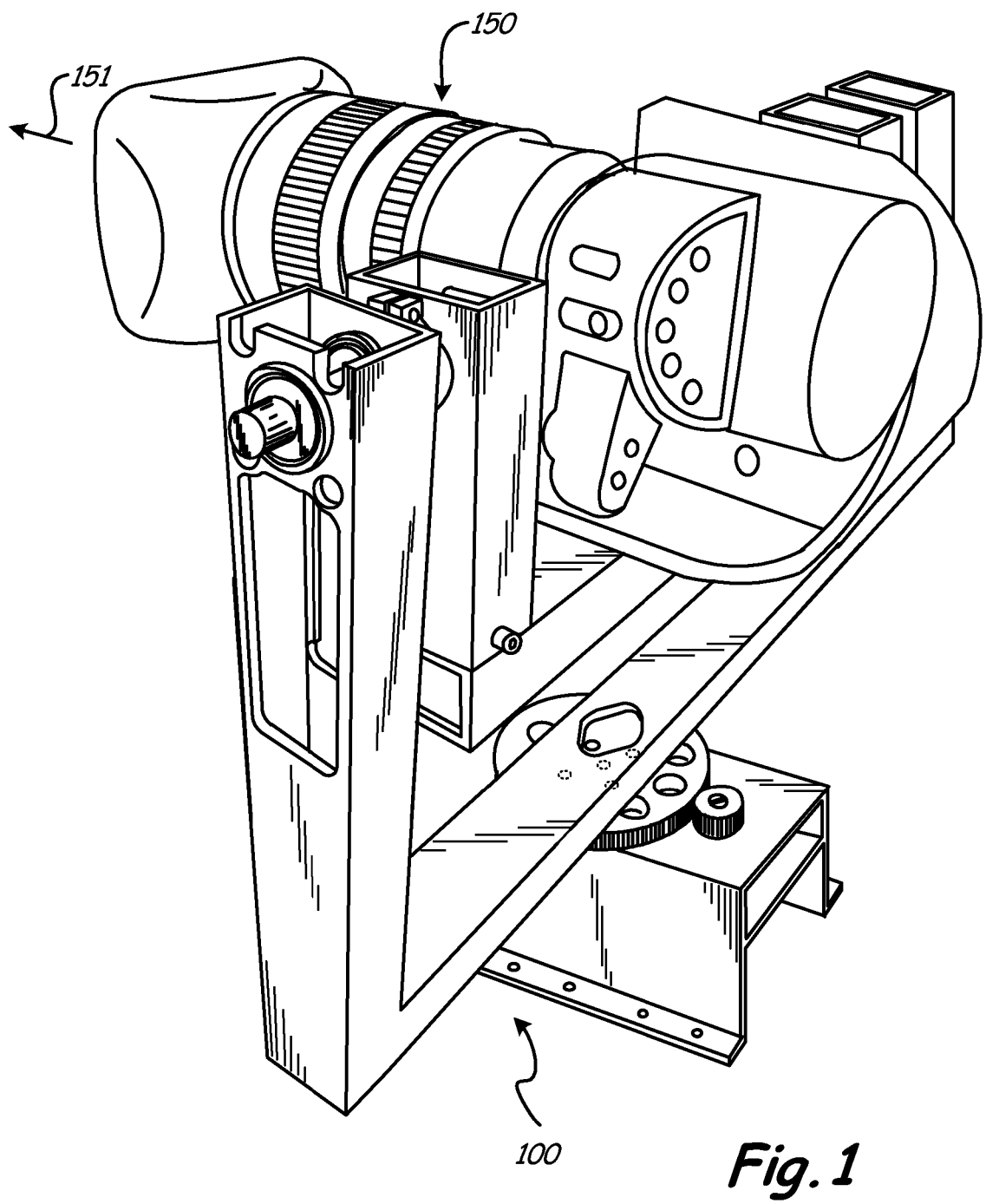
FIG. 1 is a perspective view of a pan and tilt system with an attached camera.

FIG. 1 is a perspective view of an illustrative pan and tilt system 100 with an attached camera 150. The figure shows camera 150 as a video camera. Embodiments of system 100 are able to support and position any type of camera, such as but not limited to, photographic cameras, digital video cameras, webcams, and CCD cameras. Certain embodiments of system 100 support and position relatively heavy cameras, such as but not limited to, cameras weighing up to approximately one hundred and fifty pounds.

FIG. 1 includes an arrow 151 that represents the direction of the field of view of camera 150. As will be described later in greater detail, pan and tilt system 100 is able to position a camera such as camera 150 such that its field of view can be pointed to or directed at objects within the three dimensional space surrounding the camera.

Figure 2:
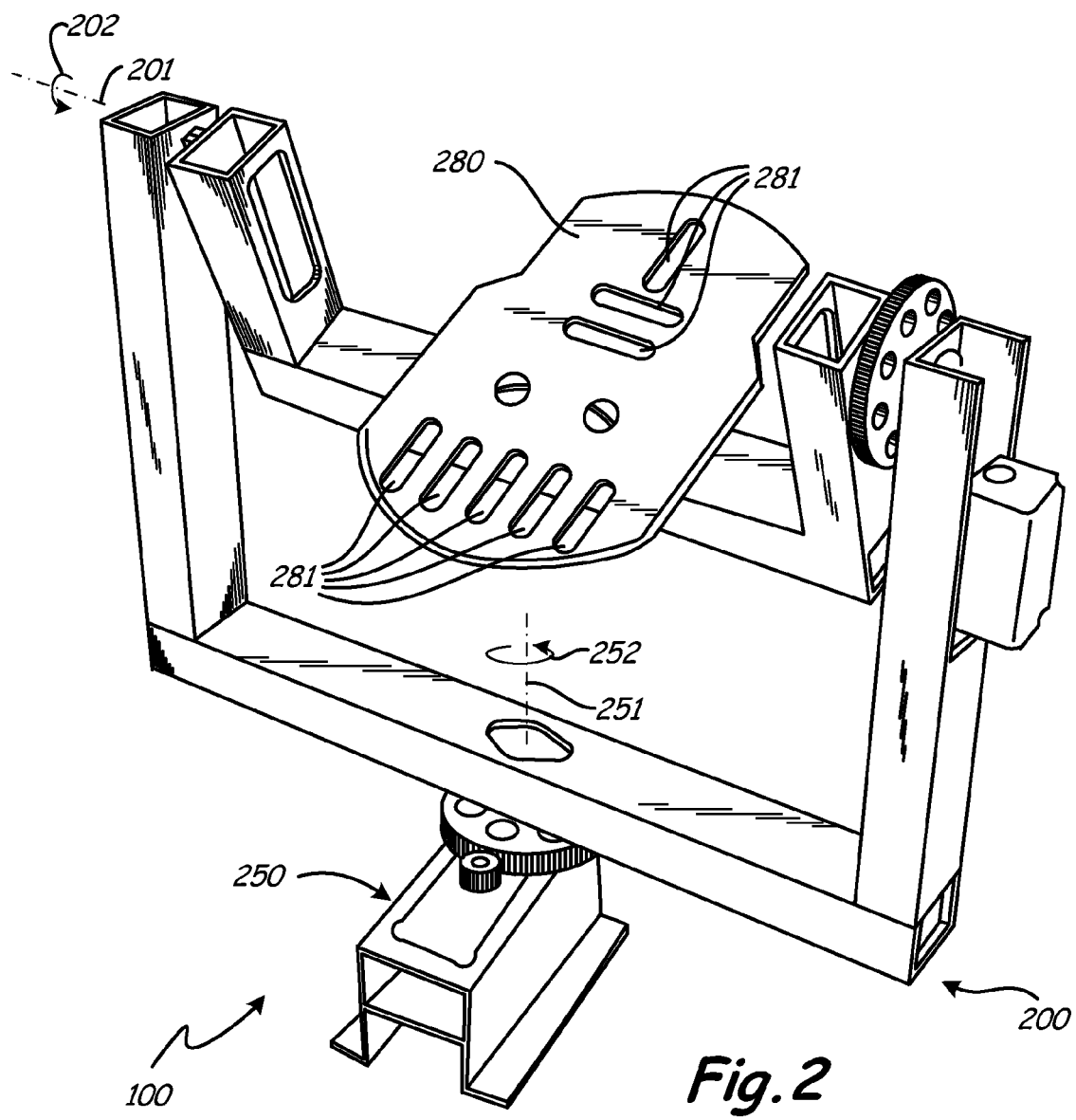
FIG. 2 is a perspective view of a pan and tilt system without an attached camera.

FIG. 2 is a perspective view of an embodiment of pan and tilt system 100 by itself (i.e. with camera 150 removed). System 100 includes a camera mounting plate 280. Plate 280 optionally includes slots or apertures 281. Apertures 281 are used to attach and position various types of cameras to pan and tilt system 100. Embodiments of camera mounting plate 280 illustratively include features such as, but not limited to, clamps, hooks, bolts, and apertures/slots of all sizes and shapes that are used to attach or secure a camera to system 100. Alternatively, in an embodiment, pan and tilt system 100 does not include a mounting plate 280 and a camera is directly attached to or secured to the bar shown in FIG. 2 as supporting plate 280.

System 100 includes a tilt system 200 and a pan system 250. Tilt system 200 includes a tilt axis of rotation 201. As will be described later in greater detail, tilt system 200 includes components that are able to rotate an attached camera about axis 201 in the direction shown by arrow 202 and in the direction opposite of that shown by arrow 202. Pan system 250 includes a pan axis of rotation 251. Pan system 250 includes components that are able to rotate an attached camera about axis 251 in the direction shown by arrow 252 and in the direction opposite of that shown by arrow 252.

Figure 3:
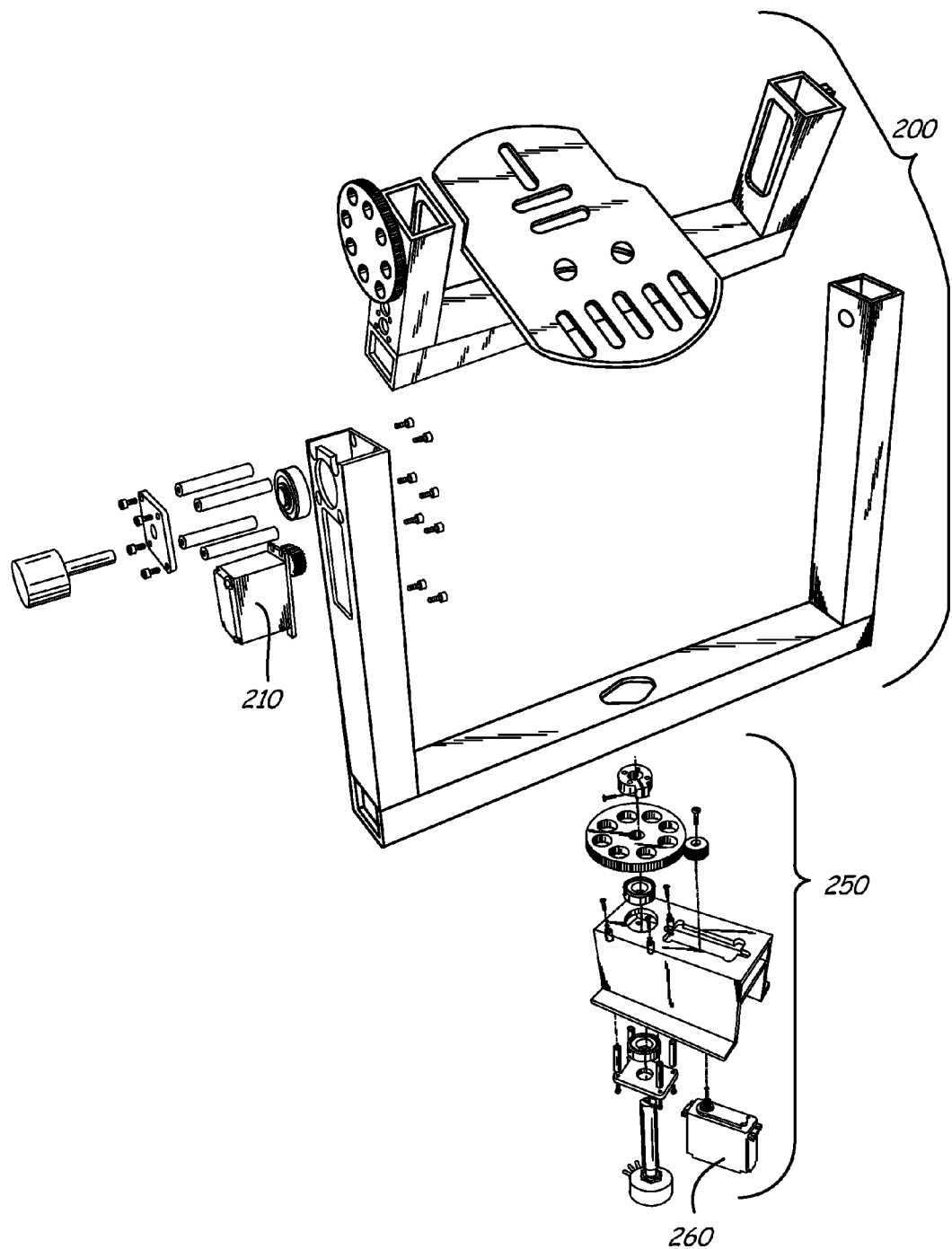
FIG. 3 is an exploded view of a pan and tilt system.

FIG. 3 is an exploded view of pan and tilt system 100. Bracket 200 represents illustrative components of a tilt system, and bracket 250 represents illustrative components of a pan system. FIG. 3 shows that the tilt system 200 includes a tilt servo 210 and that pan system 250 includes a pan servo 260. Tilt servo 210 and pan servo 260 are, in certain embodiments, hobby servo motors. Before proceeding to detailed descriptions of tilt systems and pan systems, it is worthwhile to first discuss some of the features of hobby servo motors.

II. Hobby Servo Motors

Figures 1, 4:
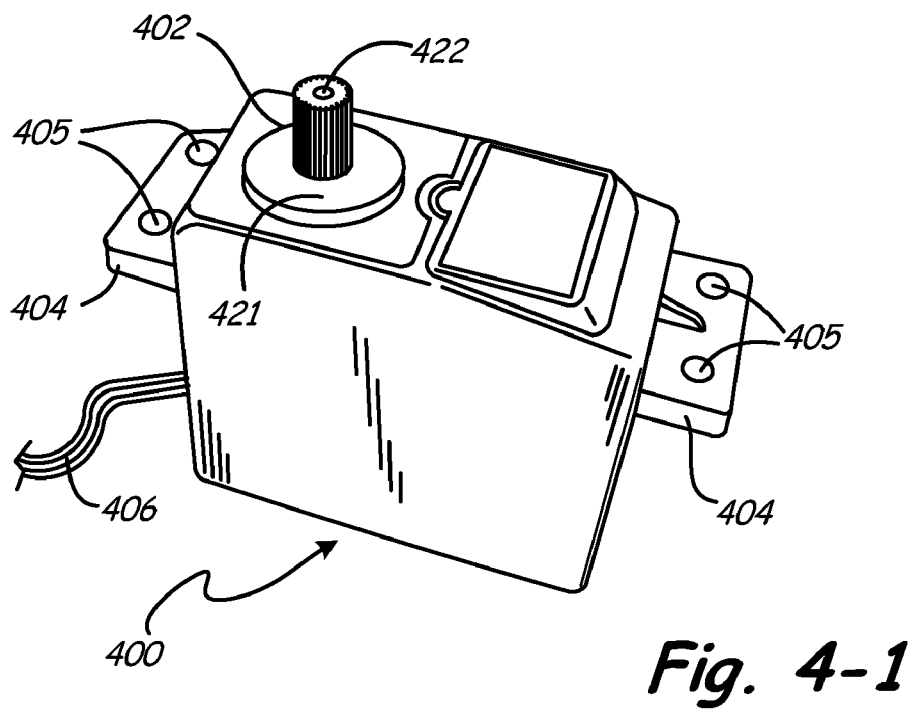
Figures 2, 4:
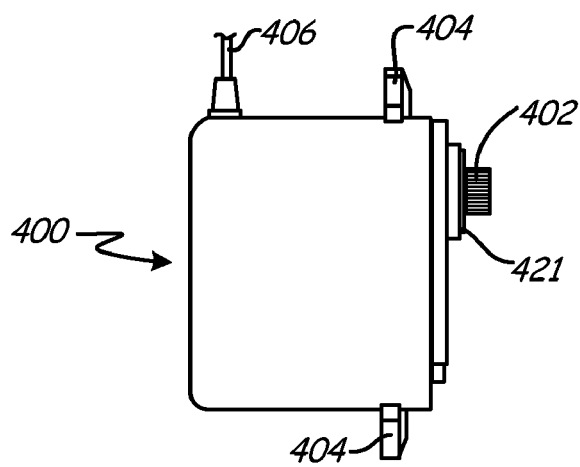
Figures 3, 4:
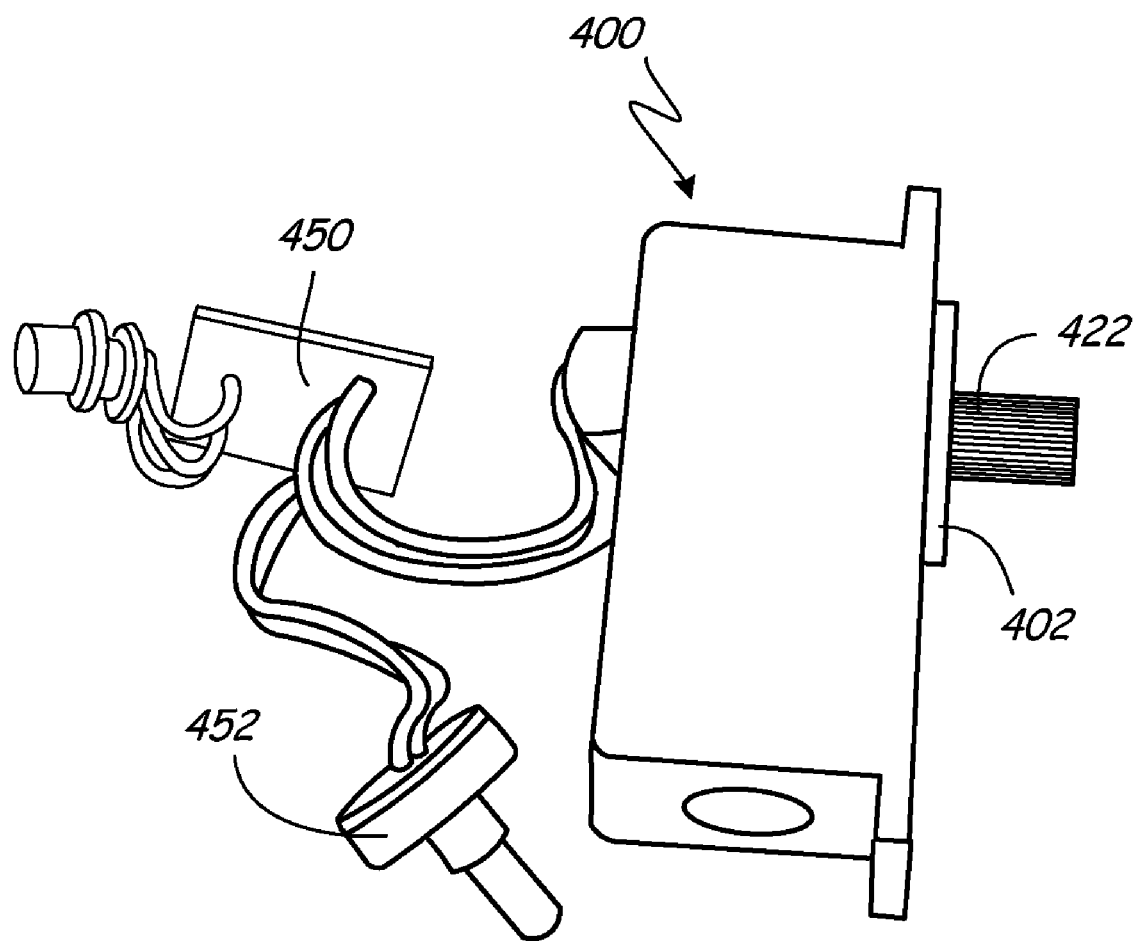

FIG. 4-1 is a perspective view of a hobby servo motor 400 and FIG. 4-2 is a side view of hobby servo motor 400. As was previously mentioned, in an embodiment, tilt servo 210 (shown in FIG. 3) and pan servo 260 (also shown in FIG. 3) are illustratively hobby servo motors such as motor 400.

Servo 400 includes attachment flanges 404. Flanges 404 optionally include apertures such as apertures 405 formed therein for receiving an attachment mechanism (e.g., a screw, bolt, etc). The attachment mechanism is utilized to secure servo 400 within an operative environment. Servo 400 also includes an electrical connection 406 that enables the servo to receive electrical power and/or control signals.

Servo 400 includes a rotatable output shaft 402 also known as a servo spline or a servo splined output shaft. Shaft 402 optionally has an outer perimeter or periphery that has splines or teeth. It is common for shaft 402 to have a 23, 24 or 25 tooth configuration. The servo output shaft 402 is positioned to specific angular positions in accordance with a coded input signal received by the servo. It is common that a particular angular position will be maintained as long as a corresponding coded signal exists on an input line. If the coded signal changes, the angular position of the servo output shaft 402 will change accordingly.

In an embodiment, output shaft 402 includes a threaded orifice 422. Threaded orifice 422 extends into splined output shaft 402 from its distal end. As will be described later, orifice 422 is illustratively used to secure an item such as a gear to shaft 402. Servo 400 further includes a planar or relatively planar surface 421 that surrounds shaft 402. In accordance with one aspect of the present disclosure, gears that are attached to, rotatably coupled to, or functionally engaged to shaft 402 also include a planar or relatively planar surface. In such an embodiment, the gear surface and surface 421 are engaged to one another in a relatively flush relationship.

FIG. 4-3 is a perspective view of hobby servo motor 400 showing an internal potentiometer 452 and control circuit 450 removed from the hobby servo housing or casing. Control circuit or circuits such as circuit 450 and an internal potentiometer such as potentiometer 452 are commonly included within the housing or casing of a hobby servo motor. The control circuitry and potentiometer are functionally connected to the hobby servo motor rotatable output shaft. Through the potentiometer (e.g., a variable resistor), the control circuitry is able to monitor the angle of the output shaft. If the shaft is at the correct angle, the motor actuates no further changes. If the shaft is not at the correct angle, the motor is actuated in an appropriate direction until the angle is correct.

Rotation of a servo output shaft such as shaft 402 is typically limited to around 180°. In most cases, rotation is limited at least because of an internal mechanical stop. It is also common that servo output shaft 402 is capable of producing a relatively limited amount of torque power. The torque and rotational limitations of a hobby servo are adequate for many applications; however, some applications require a servo having torque power and/or a rotational capacity that is beyond the capability of a typical hobby servo. Increased torque power and/or rotational capacity enable greater mechanical flexibility.

In accordance with one embodiment of the present disclosure, hobby servo motors such as servo 400 are internally modified to enable a range of output shaft rotation that is greater than its "off-the-shelf" capability. For example, in accordance with one embodiment, an internal mechanical stopping mechanism, which prevents rotation past a predetermined angle, is removed from hobby servo motor to enable for continuous rotation in either direction. As a result of the modification, the rotatable output shaft of a hacked or modified servo is able to rotate beyond the range of rotation prior to the modification.

Following modification of servo 400, limitations inherent to the internal potentiometer make it a poor choice for subsequent control functionality. As previously mentioned, in a normal servo operating configuration, the servo motor rotates the servo output shaft corresponding to the coded signal received by the servo. The output shaft is rotated until the signal from the internal potentiometer of the servo, which corresponds to the angular position of the servo output shaft, matches the coded signal received by the servo. Most hobby servos contain internal potentiometers such as potentiometer 452 shown in FIG. 4-3 that are physically limited to monitoring a limited range of angles (e.g., often less than 200 degrees). Therefore, when a servo 400 is modified for extended rotation, the internal potentiometer is not the best control component for applications that require the servo shaft to rotate beyond the typical rotation limits in order to provide improved rotational capacity. The internal potentiometer is not likely to support control of a range of rotation that is even equivalent to the original rotational range of the servo output shaft.

In accordance with one aspect of the present disclosure, the internal potentiometer is disconnected and an external/auxiliary potentiometer is inserted into the control scheme to facilitate proportional control of the servo splined output shaft. In an embodiment, servo 400 utilizes the coded input signal and the signal from an external potentiometer to rotate and position the output shaft. A particular external potentiometer having any of a variety of control characteristics can be selected and implemented based on the requirements of a given application. Therefore, a potentiometer with a rotational range of substantially less than or greater than 180° can be selected and implemented as desired.

A more detailed description of modifying a hobby servo is described in the U.S. patent application having the Ser. No. 11/153,800, which was previously incorporated by reference in its entirety.

III. Tilt Systems

Figures 1, 5:
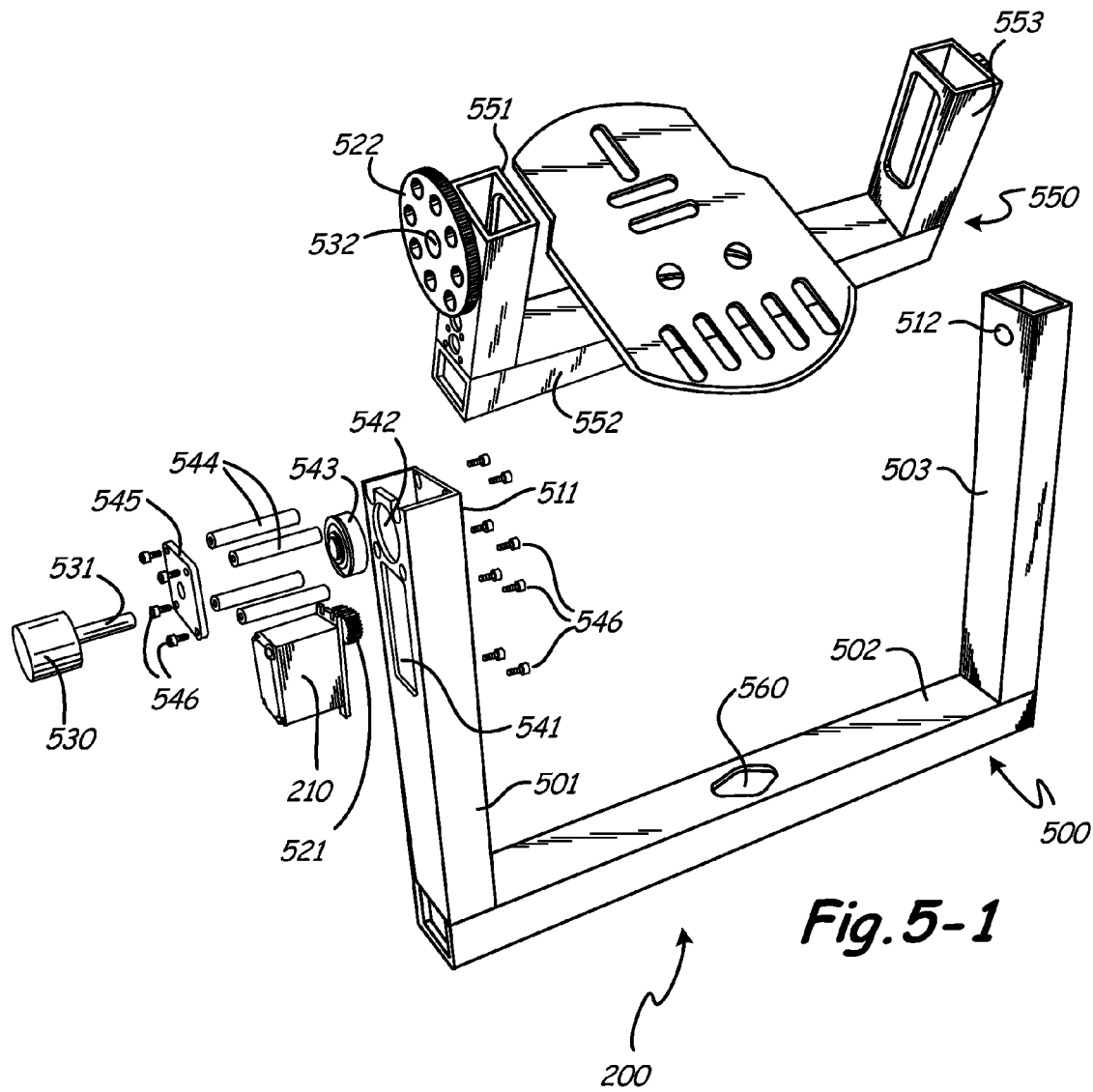
Figures 2, 5:
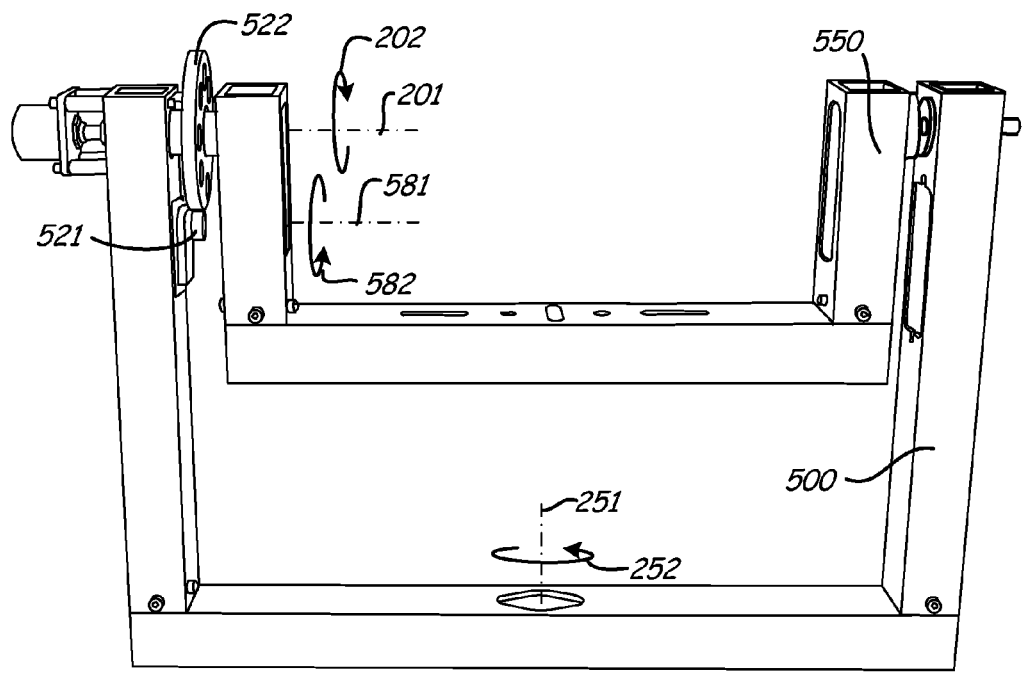

FIG. 5-1 is an exploded view of tilt system 200. Tilt system 200 illustratively includes an outer mounting bar 500 and an inner mounting bar 550. Outer bar 500 and inner bar 550 are illustratively rotatably connected at two rotation points 511 and 512. Outer bar 500 is illustratively rotated by a pan system such as pan system 250 shown in FIG. 2 about pan axis 251 also shown in FIG. 2. Inner bar 550 and any attached camera such as camera 150 shown in FIG. 1 are illustratively rotated about tilt axis 201 shown in FIG. 1 by tilt servo 210.

Outer mounting bar 500 includes a left bar 501, a bottom/center bar 502, and a right bar 503. Inner mounting bar 550 includes a left bar 5511, a bottom/center bar 552, and a right bar 553. FIG. 5-1 shows that outer bar 500 and inner bar 550 each include three bars connected or attached together at right angles. Embodiments of tilt system 200 are not however limited to bars 500 and/or bars 550 having any particular shape, configuration, or construction. For example, in an embodiment, bars 500 and 550 are each made from one piece and have smooth curves instead of sharp angles (i.e. the bars are U-shaped or are semi-circular). Also for example, in another embodiment, bars 500 and 550 are each V-shaped or substantially V-shaped.

Tilt servo motor 210 illustratively includes a tilt servo gear 521 functionally engaged to its rotatable splined output shaft such as shaft 402 shown in FIGS. 4-1 and 4-2. Tilt servo gear 521 has a "female" spline receiver that corresponds to a "male" servo output shaft and that is adapted to engage the output shaft. The servo output shaft and gear 521 are attached or engaged such that the angular position of servo gear 521 directly corresponds to the angular position of the hobby servo output shaft. In another embodiment, a tilt servo gear 521 is not included. Instead, the toothed or splined output shaft of the tilt servo motor is used directly.

Inner mounting bar 550 illustratively includes an auxiliary tilt gear 522. Auxiliary gear 522 and bar 550 are illustratively attached or connected in a fixed position such that the relative positioning of gear 522 to bar 550 does not change.

In an assembled tilt system, tilt servo gear 521 and auxiliary gear 522 are functionally or rotatably coupled or engaged such that rotation of gear 521 is translated to gear 522. In an embodiment, such as that shown in FIG. 5-1, servo gear 521 and auxiliary gear 522 both have an outer perimeter or periphery that includes teeth or splines such as, but not limited to, gear teeth. In one embodiment, the outer perimeter or periphery of auxiliary gear 522 is larger or greater than that of tilt servo gear 521. In such an embodiment, the torque associated with auxiliary gear 522 is greater than the torque of the servo motor output shaft. This expanded torque associated with gear 522 is advantageous in pan and tilt systems such as system 100 shown in FIG. 1. For example, the expanded or greater torque is used to rotate a relatively heavy camera such as a camera weighing up to one hundred and fifty pounds.

System 200 optionally includes an external potentiometer 530 and an auxiliary rotatable shaft 531. Auxiliary shaft 531 is illustratively rotatably coupled to external potentiometer 530 such that rotation of auxiliary shaft 531 is directly translated to external potentiometer 530. Auxiliary shaft 531 is also illustratively functionally engaged or coupled to auxiliary gear 522 through an aperture 532. Thus, rotation from gear 522 is directly translated to shaft 531 and to potentiometer 530 (i.e. the angular position or motion of gear 522 directly corresponds to the position or motion of shaft 531). In an embodiment, auxiliary shaft 531 is parallel or approximately parallel to the splined output shaft of the tilt hobby servo motor.

As was previously described, hobby servo motors commonly include an internal potentiometer and a mechanical stop or stops that limit the rotational capability or capacity of the hobby servo motors (e.g. limited to rotation of less than one hundred and eighty degrees). In an embodiment, tilt servo 210 initially included an internal potentiometer and a mechanical stop, but they are removed from servo 210 in tilt system 200 to enhance or increase the rotational capacity of the servo. In an embodiment, the angular position of the splined output shaft of servo 210 is controlled based at least in part upon external potentiometer 530. For example, the angular position is based upon an output signal generated by potentiometer 530. The output signal illustratively corresponds to and is generated based upon the rotation and/or angular position of auxiliary shaft 531 and/or auxiliary gear 522. In an embodiment, the angular position of the splined output shaft is also based upon a coded input signal. As was previously described, the use of an external potentiometer allows for proportional control of the angular position of the servo output shaft over a greater range than would be possible by only using an internal potentiometer commonly included in hobby servo motors.

It should be noted that the combination of an auxiliary gear such as gear 522 and an external potentiometer such as potentiometer 530 provides advantages over other pan and tilt systems such as systems that directly use an output shaft of a hobby servo to position a camera. By indirectly rotating the tilt system (i.e. the tilt axis of rotation 201 shown in FIG. 2 corresponds to the center of auxiliary gear 522 and not to tilt servo gear 521), a greater amount of torque is generated that is capable of rotating heavier cameras than could be accomplished otherwise. Also, by using an external potentiometer such as potentiometer 521 and removing the internal mechanical stop, the angular position of the hobby servo output shaft and thus the angular position of auxiliary gear 522 and any attached camera is controllable over a greater range. Consequently, tilt system 200 is able to both rotate heavier cameras and to provide a greater range of angular control.

Outer mounting bar 500 includes a servo aperture 541 and an auxiliary aperture 542. Apertures 541 and 542 create frames or supports that hold servo 210 and potentiometer 530 in place. An illustrative example of servo 210 and 530 mounted within the apertures is shown in FIG. 2. System 200 also illustratively and optionally includes a bushing or bearing assembly 543, spacers 544, a support panel 545, and screws 546. These parts are used in attaching servo 210 and potentiometer 530 in place and to provide mechanical support. Other components and methods of attaching and securing servo 210 and potentiometer 530 are within the scope of the present disclosure.

FIG. 5-1 also shows that system 200 includes an optional pan aperture 560. In an embodiment, bolts or screws are inserted into aperture 560 and secure tilt system 200 to a pan system such as pan system 250 shown in FIG. 2. Embodiments of tilt system 200 are not however limited to any particular manner of functionally or rotatably connecting, engaging, or securing system 200 to a tilt system.

FIG. 5-2 is a perspective view of an assembled tilt system 200. FIG. 5-2 shows that there are three axes of rotation associated with tilt system 200. As was previously discussed, there is a tilt axis of rotation 201. Inner mounting bar 550 is rotated relative to outer mounting bar 500 about tilt axis of rotation 201 in the direction shown by arrow 202 and in the direction opposite of that shown by arrow 202. Also as was previously discussed, in regards to FIG. 2, pan and tilt system 100 includes a pan axis of rotation 251. A pan system such as pan system 250 shown in FIG. 2 rotates a tilt system such as tilt system 200 about pan axis of rotation 251 in the direction shown by arrow 252 and in the direction opposite of that shown by arrow 252. It is worth noting that in an embodiment that pan axis of rotation 251 and tilt axis of rotation 201 are perpendicular or approximately perpendicular. Tilt system 200 further includes a tilt servo axis of rotation 581. In an embodiment, the tilt servo splined output shaft and any attached servo gear such as tilt servo gear 521, are rotated about servo axis of rotation 581 in the direction shown by arrow 582 and in the direction opposite of that shown by arrow 582. Axis 581 is illustratively parallel or approximately parallel to axis 201, and axis 581 is illustratively perpendicular or approximately perpendicular to axis 251.

Figure 6:
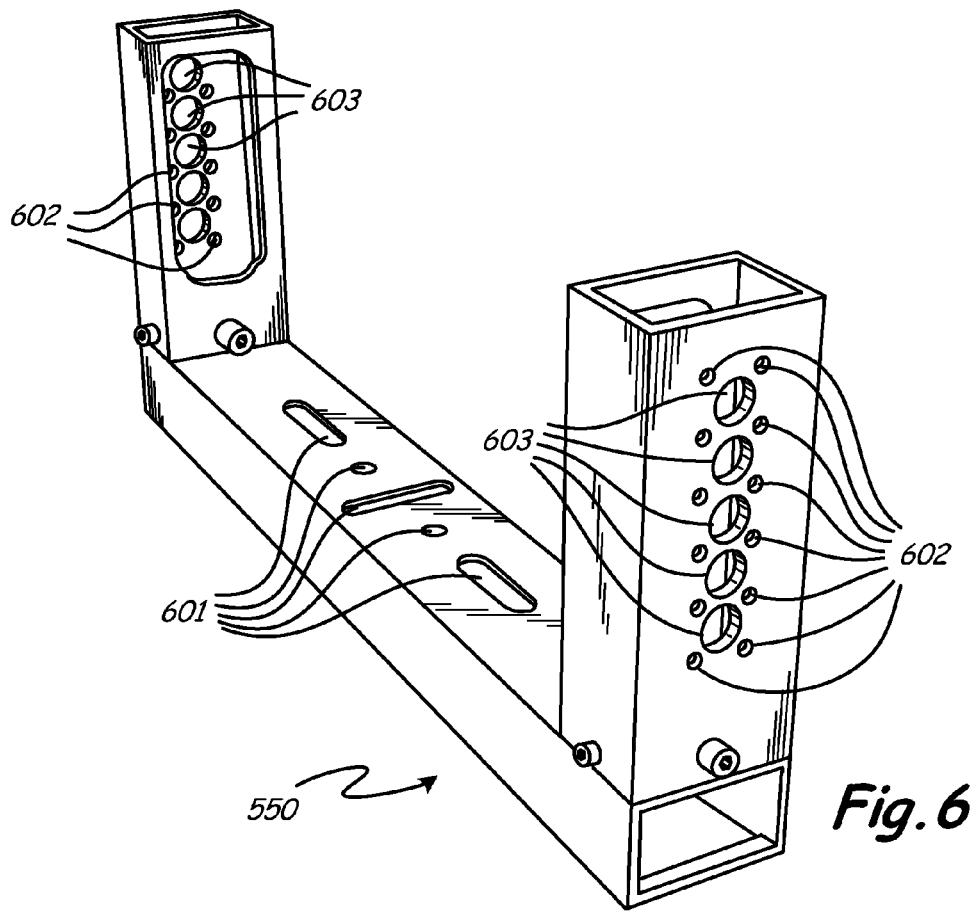
FIG. 6 is a perspective view of a tilt system inner mounting bar.

FIG. 6 is a perspective view of an embodiment of inner mounting bar 550 by itself (i.e. without a camera mounting plate or an auxiliary gear attached). Bar 550 include apertures or slots 601. apertures or slots 601 are optionally used in attaching and positioning a camera mounting plate such as plate 280 shown in FIG. 2. Alternatively, as was previously described, in an embodiment, a camera is directly attached to or secured to bar 550 without the use of a camera mounting place. In such an embodiment, apertures or slots 601 are illustratively used in attaching or securing the camera to the bar.

FIG. 6 also shows that bar 550 includes multiple small apertures 602 and multiple large apertures 603. Apertures 602 and 603 are illustratively used in attaching a or connecting an auxiliary gear such as gear 522 shown in FIG. 5-1 and/or an auxiliary shaft such as shaft 531 also shown in FIG. 5-1, to bar 550. In an embodiment, only one of the larger apertures 603 and four of the smaller apertures 602 are used in attaching a gear and/or an auxiliary shaft to a bar. In such a case, the multiple apertures allow for a variety of different relative positions of bar 550 to outer bar 500 shown in FIG. 5-1. For example, bar 550 can be mounted such that its relative position to bar 500 is higher or lower.

It is worth noting that although tilt systems such as tilt system 200 are shown in the context of operating in connection with a pan system such as pan system 250 in FIG. 2, that embodiments of tilt systems are illustratively used in other contexts such as, but not limited to, by themselves. For example, in certain applications, only tilt capabilities may be needed instead of both pan and tilt capabilities, and a tilt system such as system 200 is mounted or secured to a stationary surface by utilizing the bottom of outer mounting bar 500.

IV. Pan Systems

Figure 7:
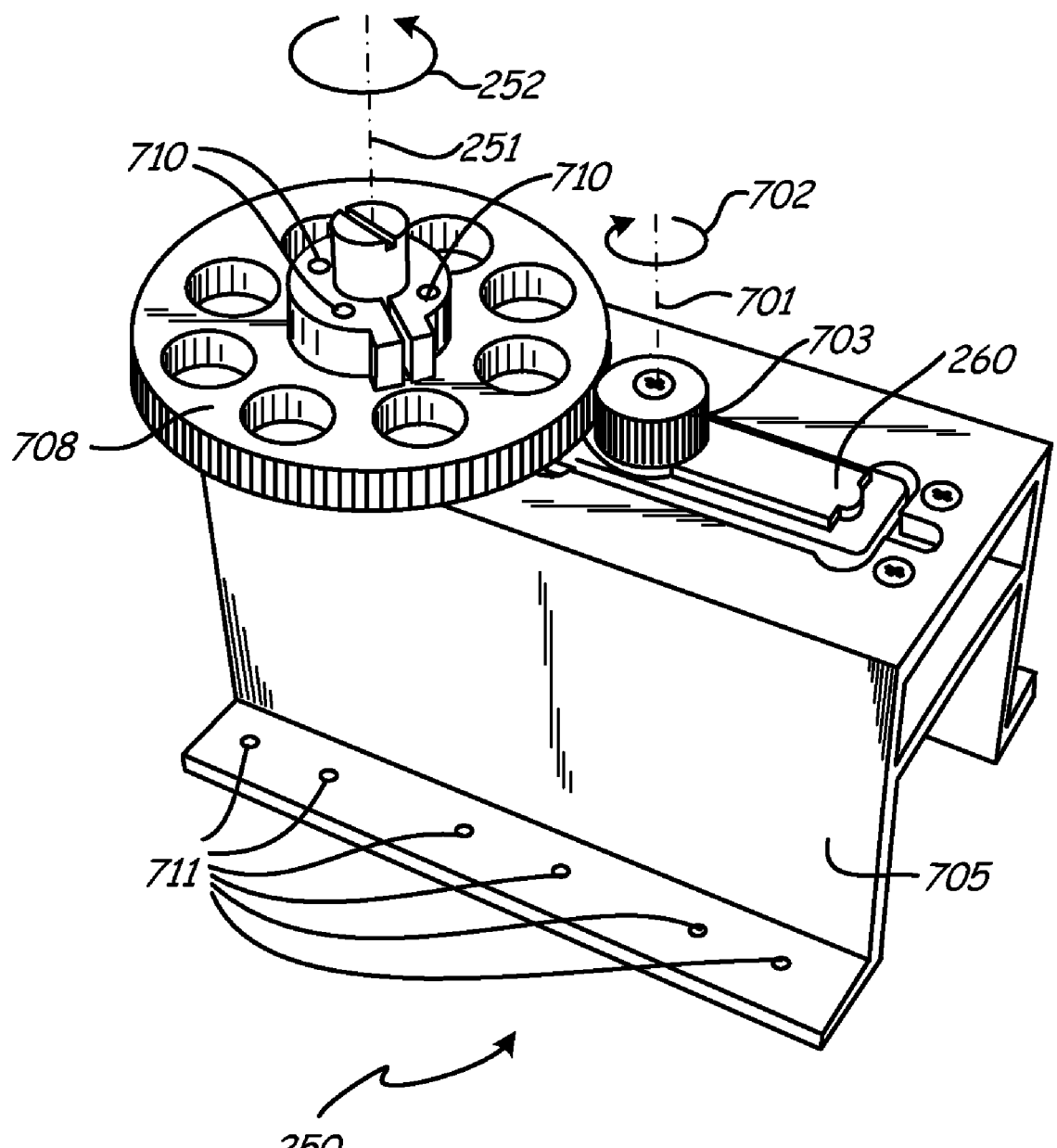
FIG. 7 is a perspective view of an assembled pan system.

FIG. 7 is a perspective view of an embodiment of an assembled pan system 250. Pan system 250 includes a pan system housing or support frame 705. Support frame 705 illustratively includes mounting or securing apertures 711 that enable system 250 to be securely placed or positioned within an operating environment. For example, system 250 is illustratively positioned on a ledge above a door utilizing apertures 711, or system 250 is illustratively mounted to the side of an industrial crane. Embodiments of pan systems are useful in a great variety of applications and are not limited to any specific application. Additionally, although pan system 250 is shown in the context of a camera pan and tilt system, pan system 250 is illustratively used by itself (i.e. without a tilt system) in other applications. As will be described in greater detail later, embodiments of pan system 250 provide greater performance capabilities such as, but not limited to, rotational capacity, torque capacity, mechanical load support capacity, and a greater range of proportional angular control than could typically be achieved with hobby servo motors. Because of this, pan system 250 is illustratively used in applications that commonly require more expensive motors.

Pan system 250 includes a pan servo 260. Servo 260 illustratively includes a pan servo gear 703. Gear 703 includes a female spline receiver such that it rotatably engages the splined output shaft of servo 260. The bottom surface of gear 703 is optionally planar or relatively planar and flushly engages a planar or relatively planar surface such as surface 421 in FIG. 4-1. In another embodiment, a pan servo gear is not used. Instead, the toothed or splined output shaft of the pan servo motor is directly used.

Pan system 250 also illustratively includes apertures 710 that are used in securing a tilt system such as tilt system 200 shown in FIG. 3 to pan system 250. Embodiments of pan system 250 are not however limited to any particular mechanisms and methods for attaching a tilt system. For example, interlocking features, clamps, adhesives, or any other type of mechanisms are included within embodiments.

Pan servo 260 has an axis of rotation 701 and rotates gear 703 about axis 701 in the direction shown by arrow 702 or in the opposite direction. Pan gear 703 is illustratively rotatably engaged with or coupled to auxiliary pan gear 708, and rotation from gear 703 is translated to auxiliary pan gear 708. Gear 708 is rotated about axis 251 in the direction shown by arrow 252 or in the opposite direction. It is worth noting that pan system 250 does not rotate an attached mechanical load such as a tilt system about servo 260's axis of rotation 701. Instead, pan system rotates a mechanical load about an axis that is parallel or approximately parallel to axis 701 and that is displaced from axis 701. Thus, servo 260 indirectly rotates an attached mechanical load.

In an embodiment, such as that shown in FIG. 7, the outer perimeter or periphery of auxiliary pan gear 708 is larger or greater than that of pan servo gear 703 (e.g. gear 708 has a larger diameter and more gear teeth than gear 703). In such an embodiment, the torque associated with auxiliary pan gear 708 is greater than the torque of the servo motor output shaft. This expanded torque associated with gear 708 is advantageous in pan and tilt systems such as system 100 shown in FIG. 1. For example, the expanded or greater torque is used to rotate a relatively heavy camera such as a camera weighing up to one hundred and fifty pounds.

Figure 8:
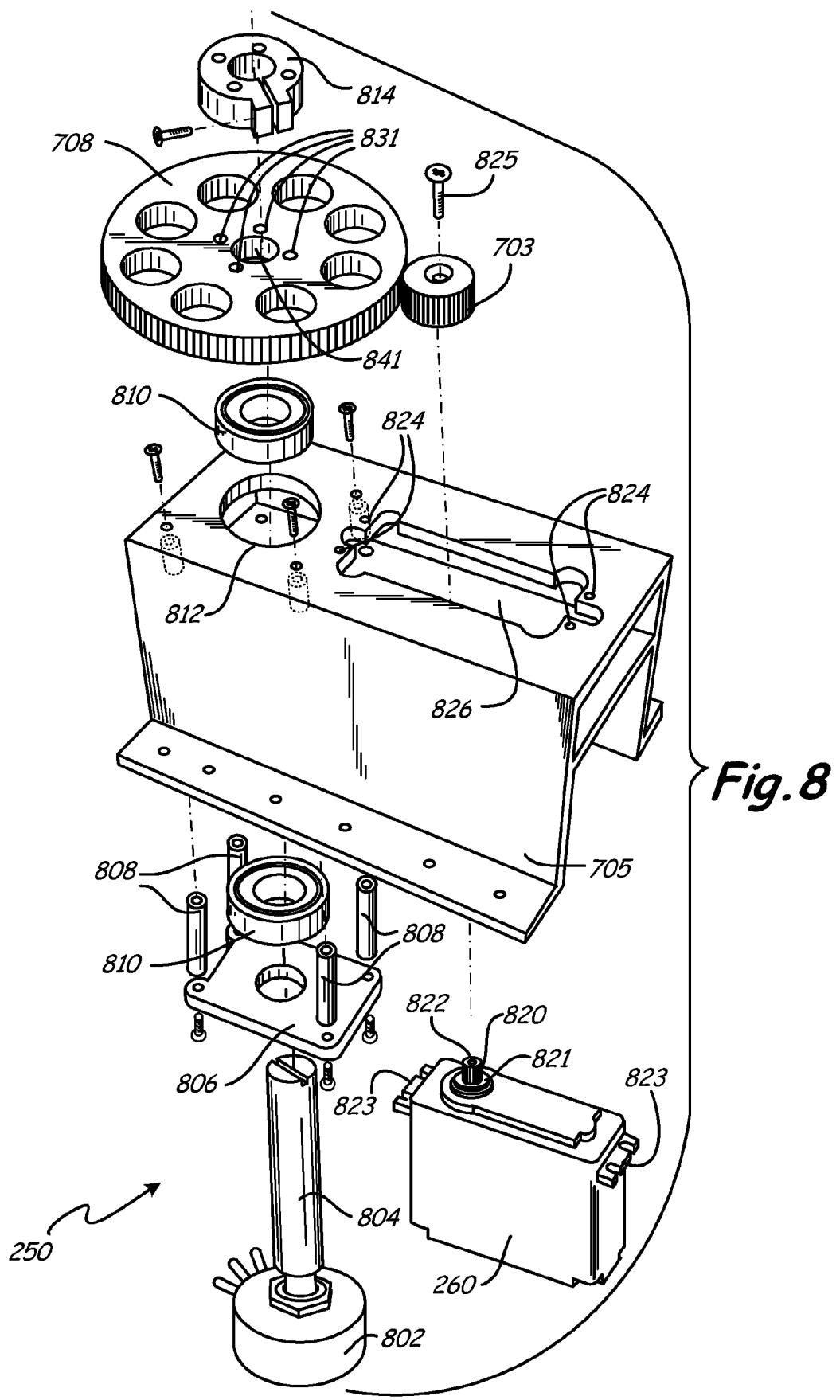
FIG. 8 is an exploded view of a pan system.

FIG. 8 is an exploded view of pan system 250. FIG. 8 is useful in showing some of the features of pan system 250 that were hidden or obstructed in the assembled view shown in FIG. 7. FIG. 8 shows that pan system 250 includes an external potentiometer 802 and an auxiliary rotatable shaft 804. Potentiometer 802 and shaft 804 are supported in part by a support plate 806, spacers 808, and bushings or bearing assemblies 810. In an embodiment, auxiliary shaft 804 is parallel or approximately parallel to the pan hobby servo motor splined output shaft 820. Auxiliary shaft 804 illustratively passes through an auxiliary aperture 812 in pan housing or support frame 705. Shaft 804 further passes through a central aperture 841 in auxiliary pan gear 708. Shaft 804 and gear 708 are secured together by a collar 814 such that rotation of gear 708 is directly translated to shaft 804 and thus to potentiometer 802. Collar 814 is illustratively secured or attached in a fixed position relative to gear 708 by threading bolts or screws through apertures 831 in auxiliary gear 708 and through the bottoms of collar apertures 710 (please note: FIG. 8 only shows the top of collar apertures 710. In an embodiment, apertures 710 extend through collar 814 such that screws or bolts may be threaded into the collar from both the top and bottom sides.).

As was previously described, hobby servo motors commonly include an internal potentiometer and mechanical stop that limit the rotational capability of the hobby servo motors (e.g. limited to rotation of less than one hundred and eighty degrees). In an embodiment, pan servo 260 initially included an internal potentiometer and a mechanical stop, but they are removed from servo 260 in tilt system 250 to enhance or increase the rotational capacity of the servo. In an embodiment, the angular position of the splined output shaft of servo 260 is controlled based at least in part upon external potentiometer 802. For example, the angular position is based upon an output signal generated by potentiometer 802. The output signal illustratively corresponds to and is generated based upon the rotation and/or angular position of auxiliary shaft 804 and/or auxiliary gear 708. In an embodiment, the angular position of the splined output shaft is also based upon a coded input signal. As was previously described, the use of an external potentiometer allows for proportional control of the angular position of the servo output shaft over a greater range than would be possible by only using an internal potentiometer commonly included in hobby servo motors.

It should be noted that the combination of an auxiliary pan gear 708 and an external potentiometer provide advantages over other pan systems such as systems that directly use an output shaft of a hobby servo to position a camera. By indirectly rotating the pan system (i.e. the pan axis of rotation 251 shown in FIG. 7 corresponds to the center of auxiliary gear 708 and not to the pan servo axis of rotation 701 also shown in FIG. 7), a greater amount of torque is generated that is capable of rotating heavier cameras than could be accomplished otherwise. Also, by using an external potentiometer such as potentiometer 802 and removing the internal mechanical stop, the angular position of the hobby servo output shaft and thus the angular position of gear 708 and any attached camera is controllable over a greater range. Consequently, pan system 250 is able to both rotate heavier cameras and to provide a greater range of angular control.

FIG. 8 further shows that pan servo 260 has a rotatable output shaft or splined shaft 820 with a threaded orifice 822 and a surrounding planar or relatively planar surface 821. As is indicated by the figure, an attachment screw 825 is illustratively passed through pan servo gear 703 and threaded into orifice 822. Gear 703 is then secured to shaft 820 and the bottom of gear 703 optionally flushly engages surface 821. Pan housing or support member 705 includes a top servo aperture 826 that allows rotatable shaft 820 to pass through. Servo 260 illustratively includes flanges 823 that include apertures such as apertures 405 shown in FIG. 4-1. Frame 705 optionally includes apertures 824 that are utilized to secure servo 260 to member 705 for example by threading a bolt through apertures in flanges 823 and apertures 824.

Figures 1, 9:
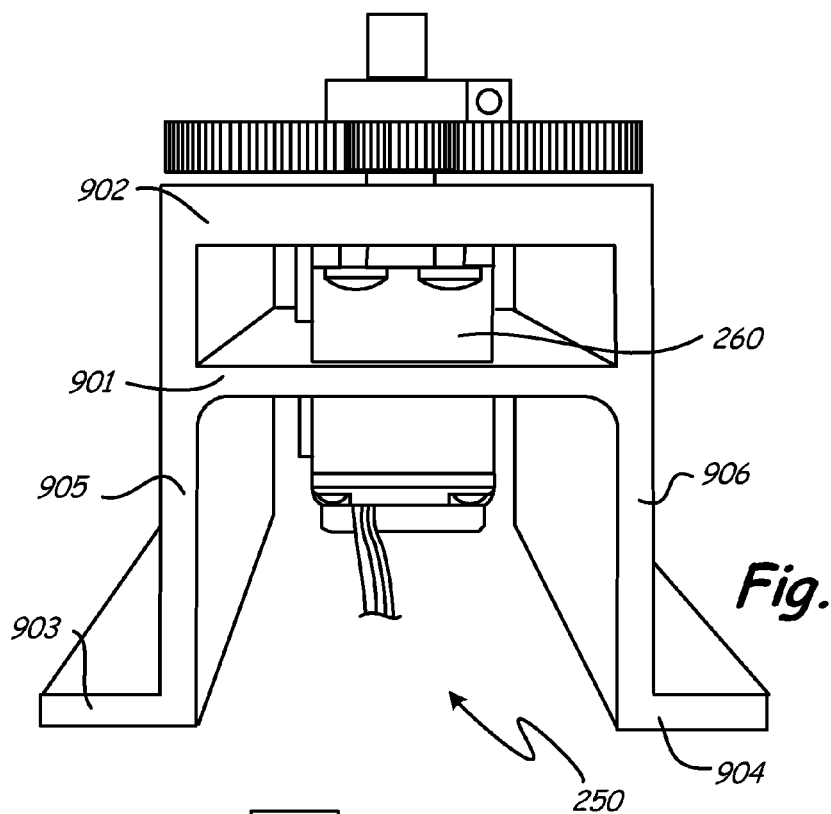
Figures 2, 9:
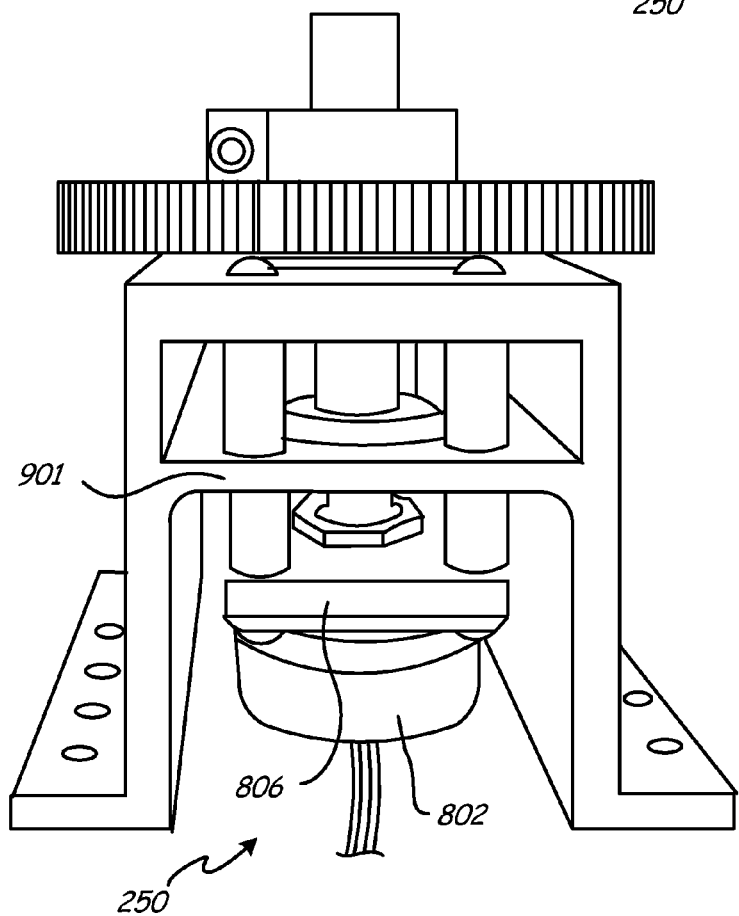

FIG. 9-1 is a side view of pan system 250 from the pan servo 260 side. FIG. 9-2 is a side view of pan system 250 from the external potentiometer 802 side. FIGS. 9-1 and 9-2 show in better detail that pan housing 705 includes a center support panel 901. As can be seen in the figures, center support panel 901 provides mechanical support to the servo and potentiometer assemblies. Panel 901 also increases the mechanical load bearing capacity of pan frame 705 (i.e. frame 705 can support a heavier load with the inclusion of panel 901).

FIG. 9-1 also shows that frame 705 includes a top panel 902, a flange panel 903, a flange panel 904, and side panels 905 and 906. As is shown in the figure, top panel 902, center support panel 901, and flange panels 903 and 904, are parallel or approximately parallel. Panels 905 and 906 are parallel or approximately parallel, and panels 901, 902, 903, and 904, are perpendicular or approximately perpendicular to panels 905 and 906 (i.e. they are at or approximately at right angles to each other). In an embodiment, such as that shown in FIG. 8, side panels 905 and 906 have a thickness that is approximately or substantially uniform throughout the panels (i.e. the panels do not have any apertures). FIG. 9-2 further shows that servo support plate 806 is parallel or approximately parallel to center support panel 901.

Figures 1, 10:
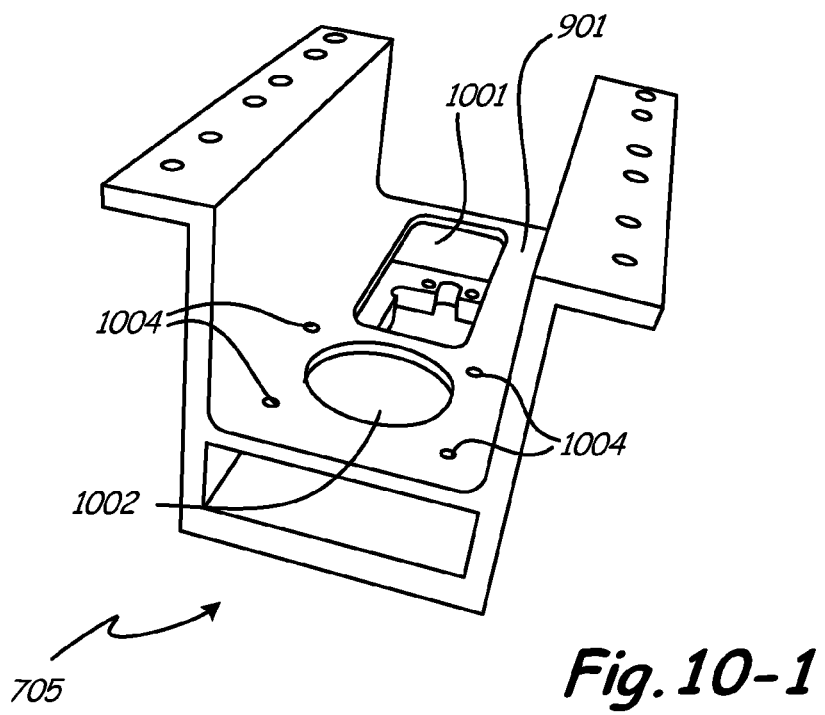
Figures 2, 10:
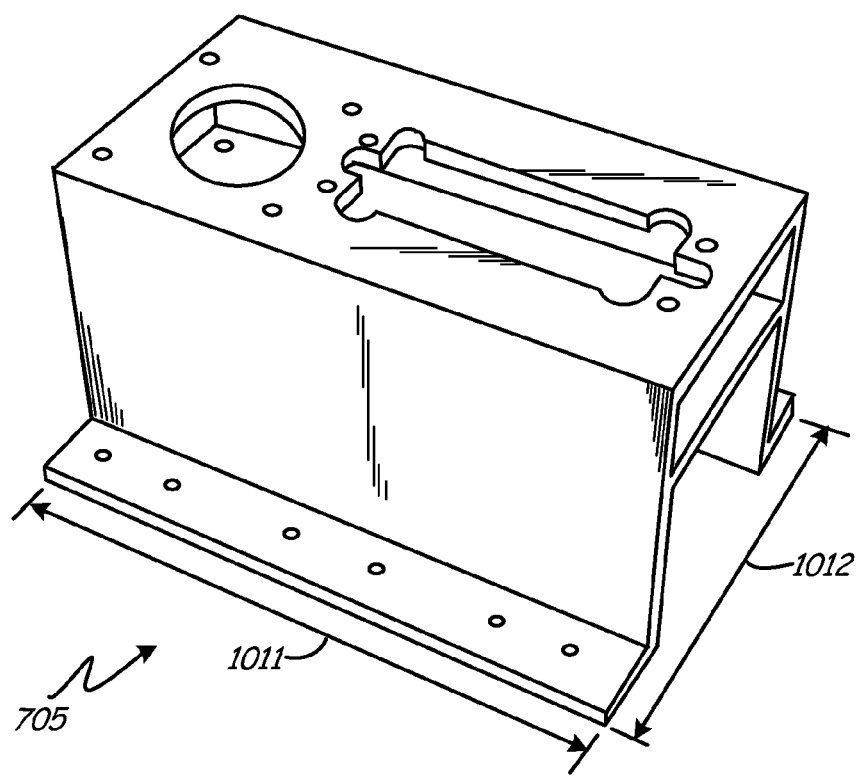
Figures 3, 10:
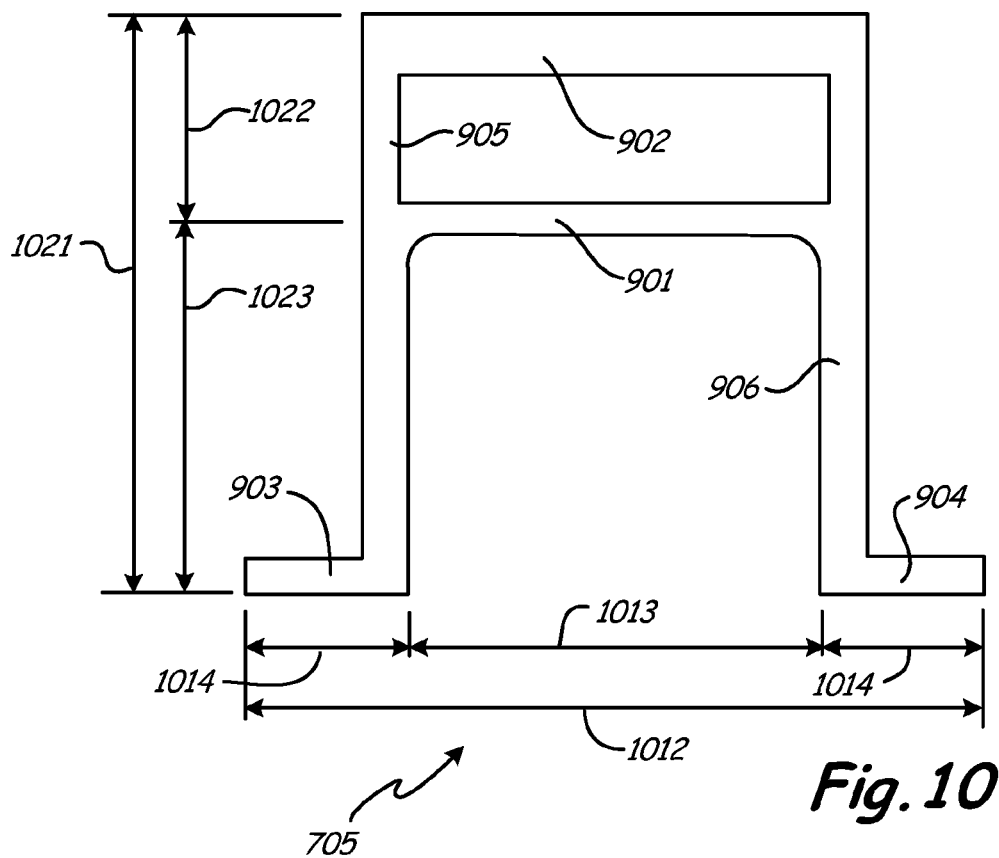

FIG. 10-1 is a perspective view of pan housing frame 705 from the bottom side. In FIG. 10-1, the servo, potentiometer, gears, and other components have been removed to more clearly show features of the frame member. FIG. 10-1 shows that center support panel 901 includes a servo aperture 1001 that allows for a servo to be attached and housed. Panel 901 also an auxiliary aperture 1002 that allows for an auxiliary rotatable shaft to pass through. In an embodiment, a bushing or bearing assembly such as bearing assemblies 810 shown in FIG. 8 fit within aperture 1002. Similarly, in an embodiment, a bushing or bearing assembly is also fit within auxiliary aperture 812 in the top panel of the frame (shown and labeled in FIG. 8). Center support panel 901 further includes spacer apertures 1004 that illustratively allow for spacers such as spacers 808 in FIG. 8 to pass through. Illustrative relative positioning of components within the apertures is shown in FIGS. 9-1 and 9-2.

FIG. 10-2 is a perspective view of pan housing frame 705 from the top side. FIG. 10-2 shows that frame 705 has a overall length 1011 and an overall width 1012. FIG. 10-3 is a side view of frame 705. FIG. 10-3 shows that frame 705 has an overall height 1021. FIG. 10-3 also shows some of the measurements of components within the frame. FIG. 10-3 shows a distance or height 1022 that is the distance from the top frame panel 902 to the center frame panel 901. Distance 1023 is the distance or height from the center frame panel 901 to the bottom of the frame (i.e. the distance from center panel 901 to flanges 903 and 904). Distance or width 1014 is the width of each of the mounting flanges, and distance or width 1013 is the width of both the top frame panel and the center frame panel.

Embodiments of pan housing 705 include all dimensions and components within housing 705 are spaced or configured differently. It is worthwhile however to note specific dimensions of at least some embodiments. In one embodiment, length 1011 is 4 inches, width 1012 is 3 inches, height 1021 is 2 and $7/32$ inches, distance 1022 is $25/32$ of an inch, width 1014 is $21/32$ of an inch, and width 1013 is 1 and $11/16$ inches. In another embodiment, length 1011 is between 2 and 6 inches, width 1012 is between 1 and 5 inches, height 1021 is between 1 and 4 inches, distance 1022 is between one quarter of an inch to 2 inches, width 1014 is between one quarter of an inch to 2 inches, and with 1013 is between one quarter of an inch to 2 and one half inches.

In another embodiment, the ratios of the relative dimensions of the components within frame 705 are utilized in sizing the components. For example, any one dimension is illustratively any dimension so long as the relative dimensions or sizing of the other components within frame 705 are maintained. In this embodiment, a frame such as frame 705 can be made of any size and still maintain favorable mechanical load bearing capability and stability. In an embodiment, the ratio of the overall height 1021 to the overall length 1011 is between 45-65%. The ratio of the overall width 1012 to the overall length 1011 is 65-85%. The ratio of the distance from the top panel to the center panel 1022 to the overall height 1021 is 25-45%. The ratio of the width of each flange 1014 to the overall width 1012 is 15-25%. The ratio of the width of top panel and the center panel 1013 to the overall width is 75-85%, and the ratio of the width of top and center panel 1013 to overall length 1011 is 30-50%.

Embodiments of frame 705 are made from any type of material. In one embodiment frame 705 is made from a metal such as, but not limited to, aluminum, stainless steel, copper, or titanium. In one embodiment, frame 705 is made from 6061-T6 anodized aluminum. Embodiments also include any thickness of the individual components. In one embodiment, the thickness of frame 705 is between 1/32 of an inch to one half of an inch. Other components of pan and tilt system 100 shown in FIG. 1 such as outer bar 500 shown in FIG. 5-1 and inner bar 550 also shown in FIG. 5-1, are illustratively made of the same or similar materials and thicknesses.

In an embodiment, frame 705 is one piece. In such an embodiment, frame 705 is illustratively made by an extrusion process and apertures are mechanically stamped out. In another embodiment of a one piece frame, a casting process is used in which liquid metal is poured into a mold of the desired shape. Any other method of forming frame 705 as one piece is also within the scope of the present disclosure. Alternatively, frame 705 is made from multiple pieces and are attached together for example, but not limited to welding.

Figures 1, 11:
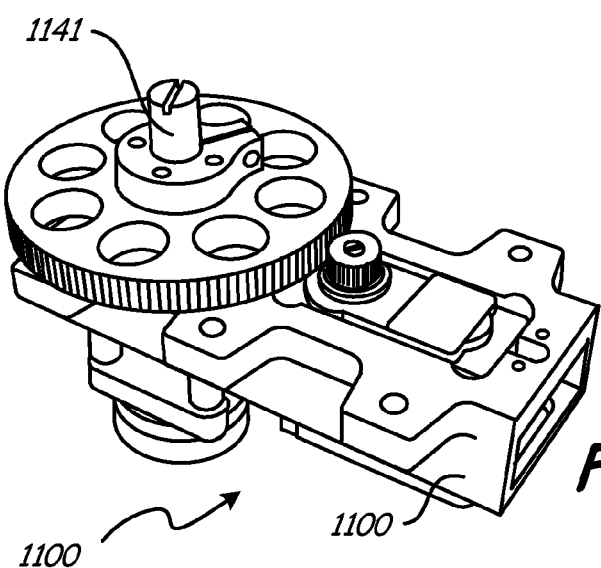
Figures 2, 11:
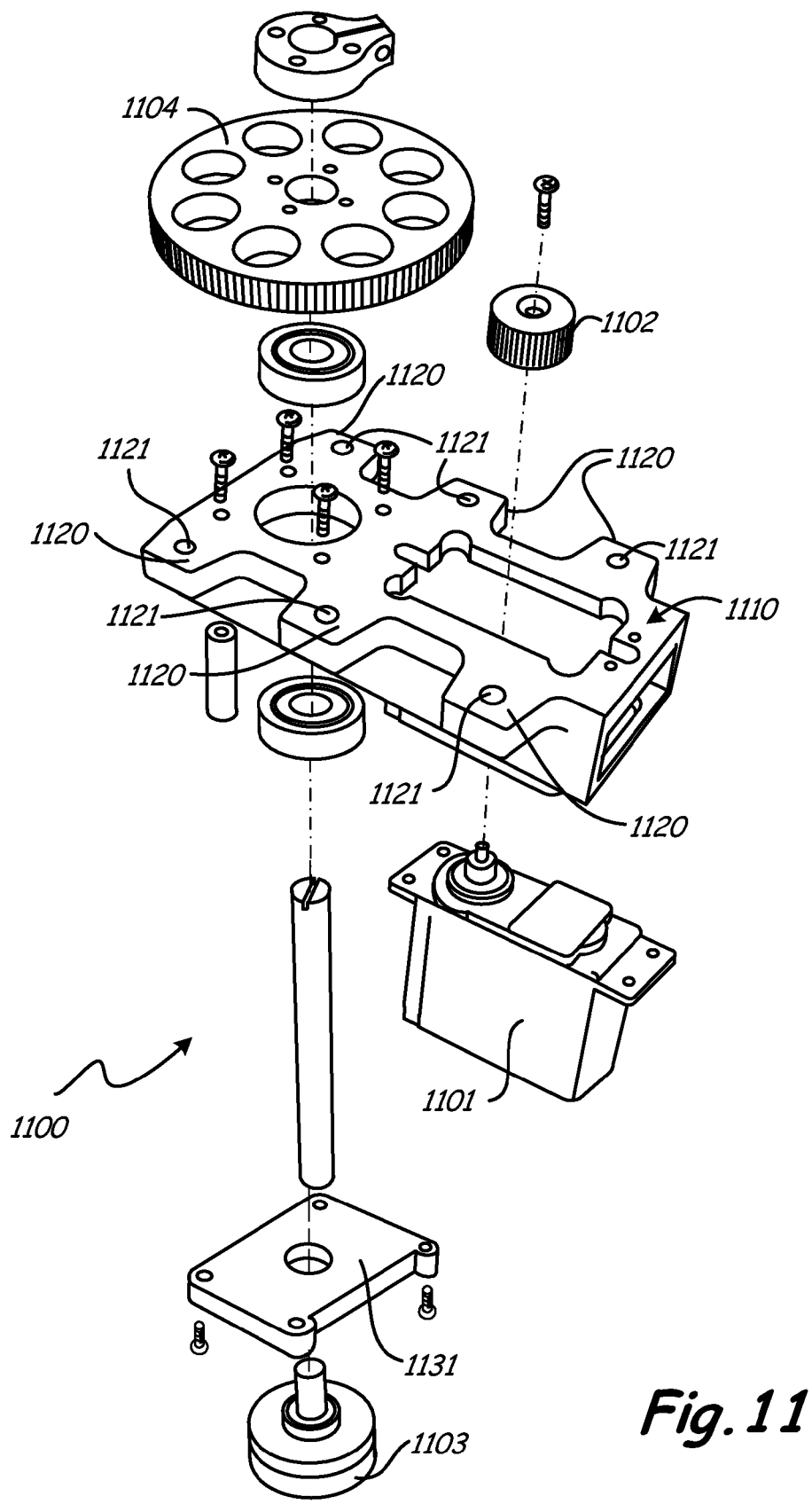
Figures 3, 11:
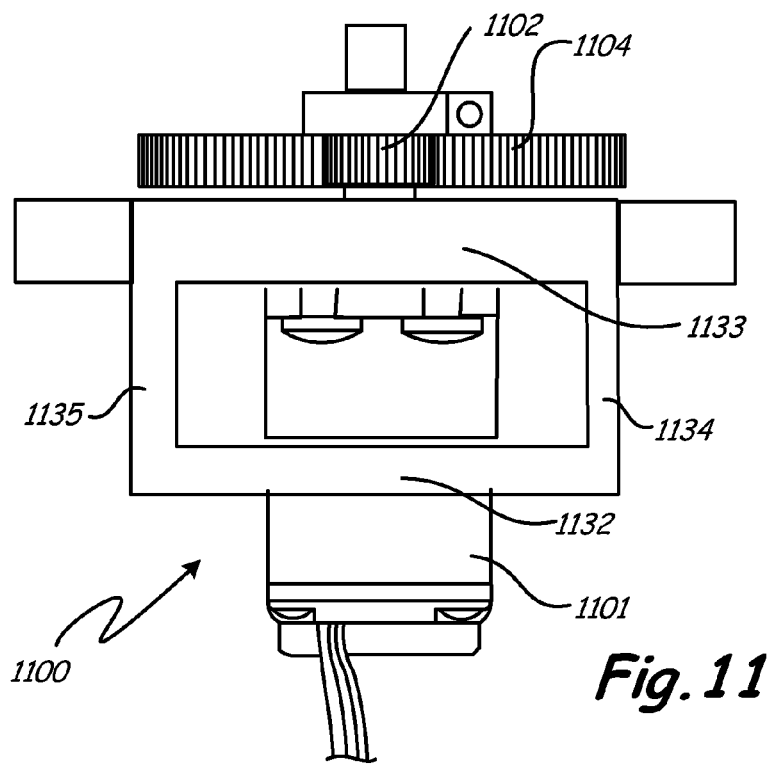
Figures 4, 11:
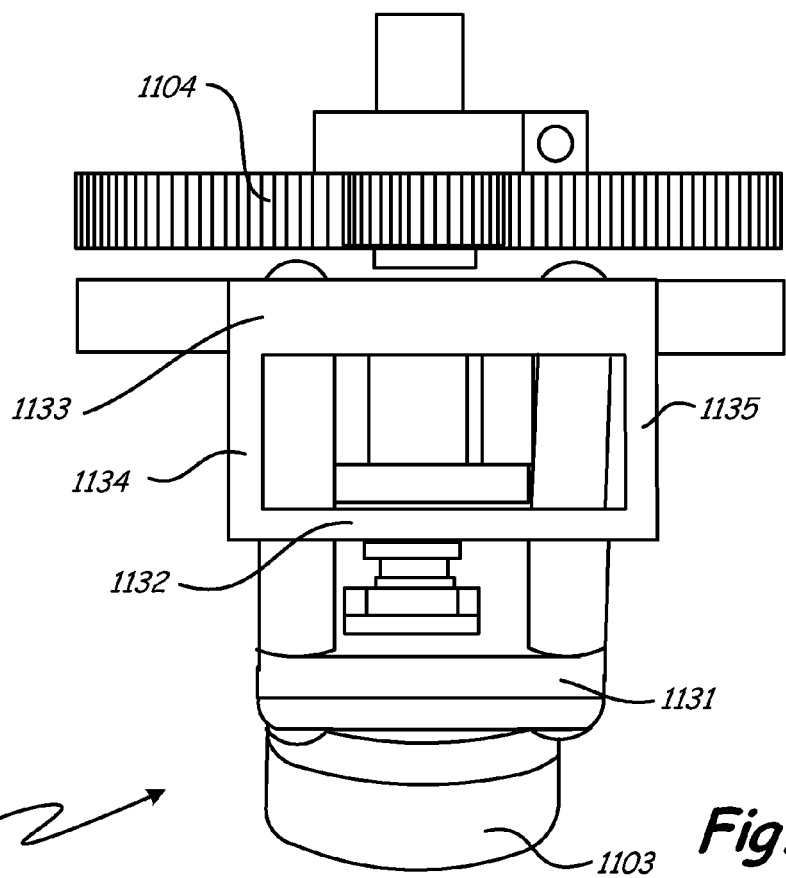
Figures 5, 11:
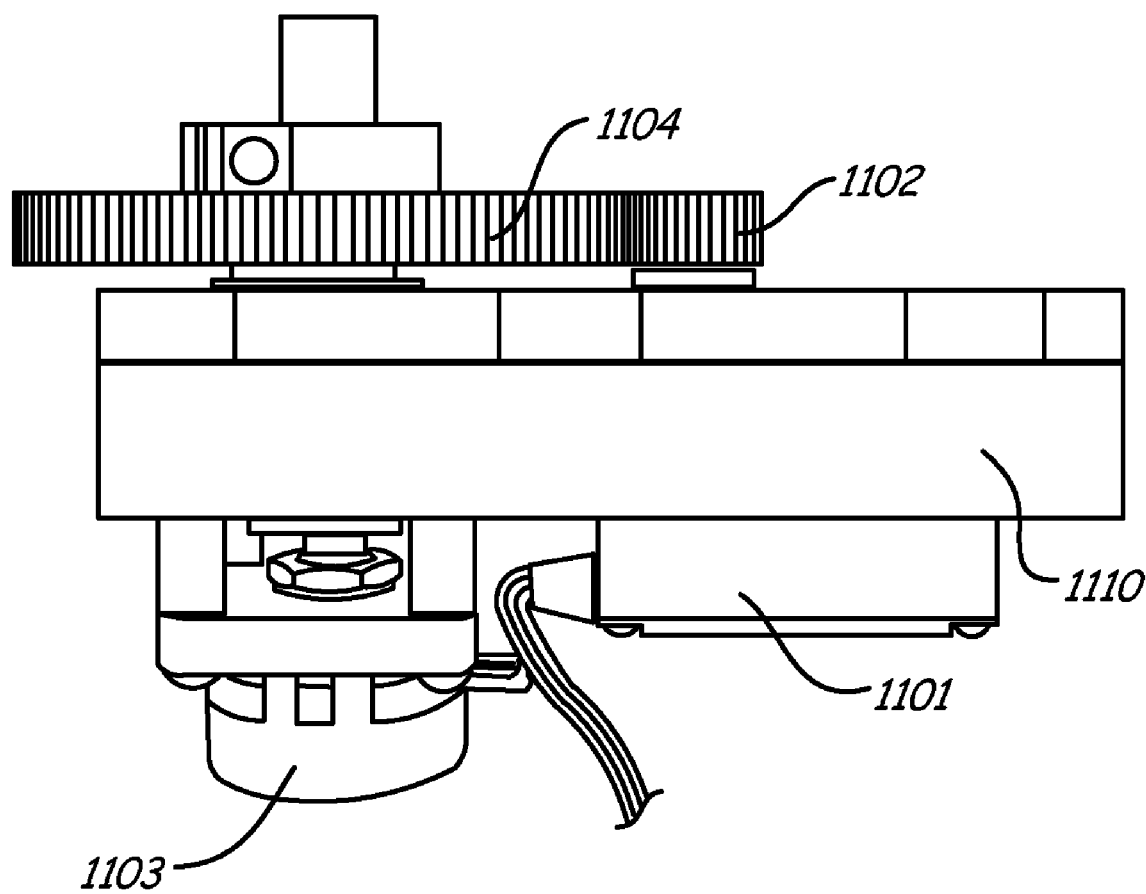

FIGS. 11-1, 11-2, 11-3, 11-4, and 11-5 show an alternative pan system 1100. FIG. 11-1 is a perspective view of system 1100. FIG. 11-2 is an exploded view of system 1100. FIG. 11-3 is a side view of system 1100 from the servo side. FIG. 11-4 is a side view of system 1100 from the potentiometer side, and FIG. 11-5 is a side view of system 1100.

Pan system 1100 is illustratively used in a pan and tilt system such as pan and tilt system 100 in FIG. 1. In such a system, a tilt system such as tilt system 200 in FIG. 5-1 is attached to or otherwise secured to rotatable auxiliary shaft 1141. Also, similar to as was discussed in regards to pan system 250, pan system 1100 is illustratively used in systems other than pan and tilt systems.

FIG. 11-2 shows that system 1100 includes a pan hobby servo motor 1101, an external potentiometer 1103, a pan housing/frame 1110, a pan servo gear 1102, an auxiliary pan gear 1104, and a potentiometer support panel 1131. In an embodiment, the components of system 1100 are the same or similar to the components of pan system 250, except for frame 1110. The differences between the frame of system 1100 and the frame of system 250 enable system 1100 to be mounted or secured differently than system 250. This enables system 250 to be able to be placed in or included within operating environments that may not be appropriate for system 250.

FIG. 11-2 shows that pan housing/frame 1110 includes six flanges 1120 that each optionally includes an aperture 1121. In certain embodiments, frame 1110 includes more or less flanges than the illustrated six. For example, in an embodiment, frame 1110 includes between two to ten flanges. Flanges 1120 and 1121 illustratively enable system 1100 to be attached to or secured within an operating environment.

FIGS. 11-3 and 11-4 shows that frame 1110 includes a top panel 1133, a center support panel 1132, and side panels 1134 and 1135. As is shown in the figure, panels 1132 and 1133 are parallel or approximately parallel. Panels 1134 and 1135 are parallel or approximately parallel, and panels 1132 and 1133 are perpendicular or approximately perpendicular to panels 1134 and 1135. Panels 1132 and 1133 illustratively both include an auxiliary aperture for an auxiliary rotatable shaft and a servo aperture. In an embodiment, the apertures are the same or similar to the apertures of frame 705 shown in FIGS. 8 and 10-1. Frame 1110 is also illustratively made from the same materials and methods as frame 705.

V. CONCLUSION

Although the present disclosure has been described with reference to certain embodiments of tilt systems and pan systems, workers skilled in the art will recognize that changes may be made in form and detail without departing from the spirit and scope of the invention.

What is claimed is:

1. A pan system comprising:
   a hobby servo motor having a splined output shaft;
   a rotatable auxiliary shaft that is approximately parallel to the splined output shaft; and
   a support frame, the support frame having a top panel, a first side, and a second side, wherein the first side and the second side are approximately parallel, wherein the top panel is approximately perpendicular to the first side and the second side, wherein the top panel includes a hobby servo motor aperture and an auxiliary shaft aperture, wherein the hobby servo motor is positioned within the hobby servo aperture, wherein the rotatable auxiliary shaft is positioned within the auxiliary shaft aperture; and
   wherein angular rotation of the splined output shaft is controlled based at least in part on a coded input signal.

2. The pan system of claim 1 wherein each of the first and second sides has a top and a bottom, wherein the top panel is positioned along the tops of the first and second sides, and wherein the frame includes a center panel that is positioned between the tops and the bottoms of the sides.

3. The pan system of claim 1 and further comprising a potentiometer that is functionally connected to the rotatable auxiliary shaft, and wherein the angular rotation of the splined output shaft is further controlled based at least in part on an output signal of the potentiometer.

4. The pan system of claim 1 wherein the hobby servo motor aperture is approximately rectangular.

5. The pan system of claim 1 wherein the splined output shaft is functionally engaged to a gear, and wherein rotation of the gear rotates the rotatable auxiliary shaft.

6. The pan system of claim 5 wherein the rotatable auxiliary shaft is functionally engaged to a second gear, and wherein the rotatable auxiliary shaft is rotated by contact between the gear and the second gear.

7. The pan system of claim 6 wherein a diameter of the second gear is greater than a diameter of the gear.

8. The pan system of claim 1 wherein the support frame includes flanges that are approximately parallel to the top panel, wherein each of the first and second sides includes a top and a bottom, wherein the top panel is located at the tops of the first and second sides, and wherein the flanges are located at the bottoms of the first and second sides.

9. The pan system of claim 8 wherein the flanges include apertures, and wherein the flanges extend along a length of the first and second sides.

10. A pan system comprising:
a hobby servo motor having a rotatable splined output shaft;
a servo gear engaged to the output shaft;
an auxiliary gear rotatably coupled to the servo gear;
an auxiliary shaft connected to the auxiliary gear such that rotation of the auxiliary gear is translated to the auxiliary shaft;
a support frame having a top panel, the top panel including a servo aperture and an auxiliary aperture, wherein the hobby servo motor is positioned within the servo aperture, and wherein the auxiliary shaft is positioned within the auxiliary aperture;
an external potentiometer that is functionally connected to the auxiliary shaft; and
wherein an angular position of the splined output shaft is controlled based at least in part on a signal from the external potentiometer.

11. The pan system of claim 10 wherein the splined output shaft has a first axis of rotation, wherein the auxiliary gear has a second axis of rotation, wherein the first and second axes are approximately parallel, and wherein the auxiliary gear has more gear teeth than the servo gear.

12. The pan system of claim 10 wherein the top panel has a rectangular shape.

13. The pan system of claim 10 wherein the support frame comprises a first side and a second side that are both approximately perpendicular to the top panel, wherein each of the first and second sides has a length, and wherein the first side and the second side are separated from each other by a same distance along the lengths of the first and second sides.

14. The pan system of claim 10 wherein a first bearing assembly is positioned within the top panel auxiliary aperture, and wherein the auxiliary gear is connected to the auxiliary shaft utilizing a collar.

15. The pan system of claim 10 wherein the servo aperture is non-circular.

16. A pan system comprising:
a hobby servo motor having a rotatable splined output shaft;
a servo gear engaged to the output shaft;
an auxiliary gear rotatably coupled to the servo gear;
an auxiliary shaft connected to the auxiliary gear such that rotation of the auxiliary gear is translated to the auxiliary shaft;
a support frame having a servo aperture and an auxiliary aperture, wherein the hobby servo motor is positioned within the servo aperture, wherein the auxiliary shaft is positioned within the auxiliary aperture; and
wherein rotation of the hobby servo motor is controlled based at least in part on a coded input signal.

17. The pan system of claim 16 wherein the auxiliary gear has more gear teeth than the servo gear.

18. The pan system of claim 16 wherein a diameter of the auxiliary gear is larger than a diameter of the servo gear.

19. The pan system of claim 16 and further comprising a collar attached to the servo gear, and wherein the servo gear is located between the collar and the support frame.

20. The pan system of claim 16 wherein a shape of the servo aperture is different than a shape of the auxiliary aperture.

* * * * *